J. E. LITTLEFIELD.
Cattle-Tie.
No. 199,653.      Patented Jan. 29, 1878.
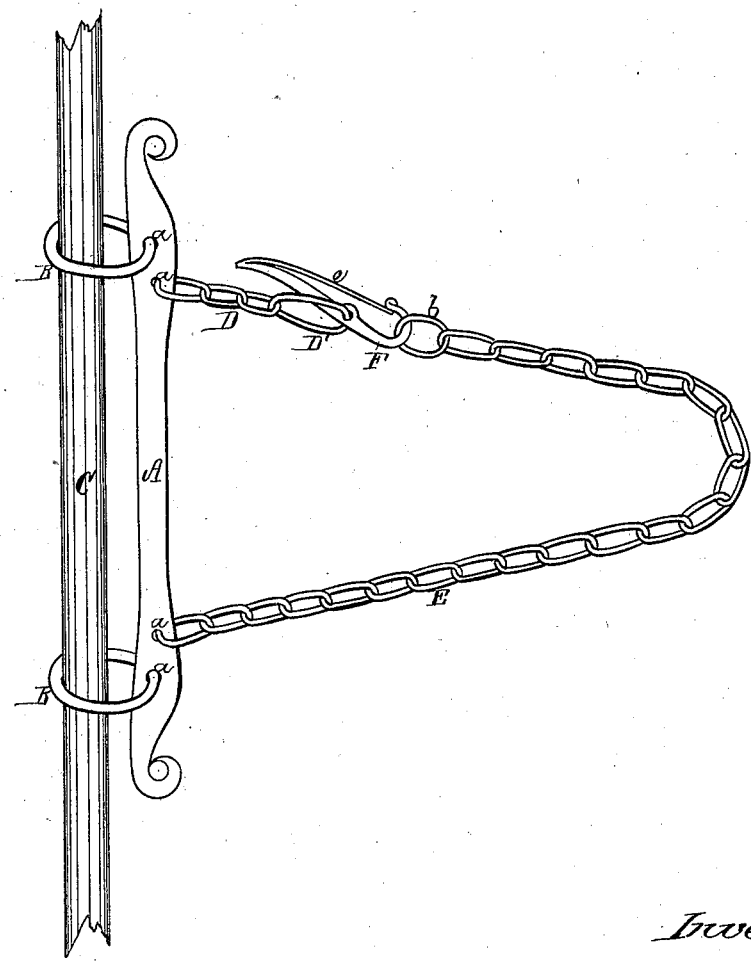
Witnesses.
S. N. Piper
L. N. Miller
Inventor
Jason E. Littlefield
by his attorney.
R. N. Eddy

UNITED STATES PATENT OFFICE.

JASON E. LITTLEFIELD, OF EAST THORNDIKE, MAINE.

IMPROVEMENT IN CATTLE-TIES.

Specification forming part of Letters Patent No. 199,653, dated January 29, 1878; application filed December 11, 1877.

*To all whom it may concern:*

Be it known that I, JASON E. LITTLEFIELD, of East Thorndike, of the county of Waldo and State of Maine, have invented a new and useful Cow-Fastener; and do hereby declare the same to be described in the following specification, and represented in the accompanying drawing, which is a perspective side view of it as applied to a post.

It is for securing a cow, ox, or other animal to a post in a barn; and consists of a slide-bar, two rings, and chains, provided with a catch-eye and a snap-hook, all being substantially as represented.

In the drawing, A denotes the slide-bar, having four holes, $a$, arranged in it, as shown. Rings B B, going through two of such holes, extend around a post, C, in order to connect the bar to the post, and allow such bar to freely move up and down in parallelism therewith. Two chains, D E, are linked in the other two holes of the bar, the longer chain being provided with a catch ring or eye, $b$, and the shorter with a snap-hook, F, all being as shown.

To secure an animal to the post, the chains are to be passed around the neck of such animal, and after which the snap-hook should be engaged with the catch-eye.

The supporting-link D′ of the snap-hook I prefer to have extend through a hole in the shank of the hook at about two-thirds of its length from its smaller end, or at or near the junction of the shank and the crook of the hook, as shown, the spring $e$ being fastened to such end. This enables me to advantageously disengage the snap-hook from the catch-eye in case of the animal bearing hard on the chain, as the snap-hook can be used as a lever to overcome the strain.

With the said cow-fastener, an animal, when secured by it to a post, can move her head and neck up or down, or can readily lie down, as occasion may require, and, besides, she cannot rub the snap-hook against anything to disengage such hook from the catch-eye. Nor can she get her head either over or under the fastener.

I disclaim a cattle-tie made as shown in the United States Patent No. 61,138, it having no lever snap-hook like that of my cow-fastening, whereby the chains can be readily disconnected under the strain of an animal on them, which cannot be easily accomplished with a common snap-hook.

I claim—

1. The cow-fastener snap-hook, having the supporting-link arranged with or pivoted to its shank at or near its junction with the crook, substantially as represented.

2. The combination of the snap-hook, having its shank projecting in opposite directions from its sustaining-link D′, as represented, with the chains D E and the slide-bar A, provided with the rings B B, all being as set forth.

JASON E. LITTLEFIELD.

Witnesses:
 J. H. STEVENS,
 R. S. RICH, Jr.